April 24, 1962     R. H. RIDNOUR     3,030,865
REACTIONLESS ROCKET LAUNCHER
Filed March 18, 1959
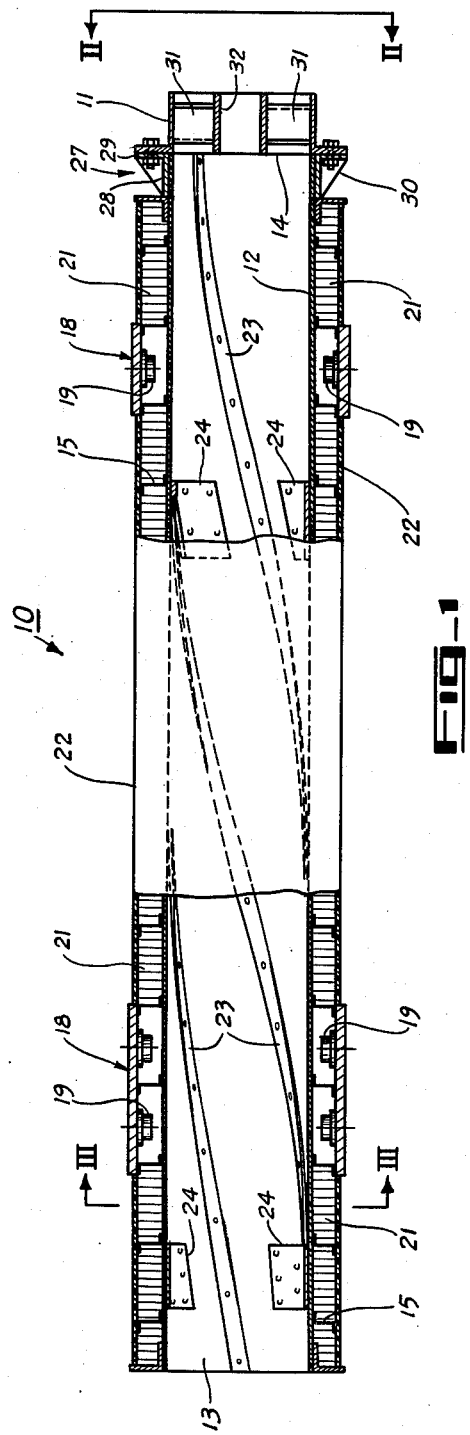
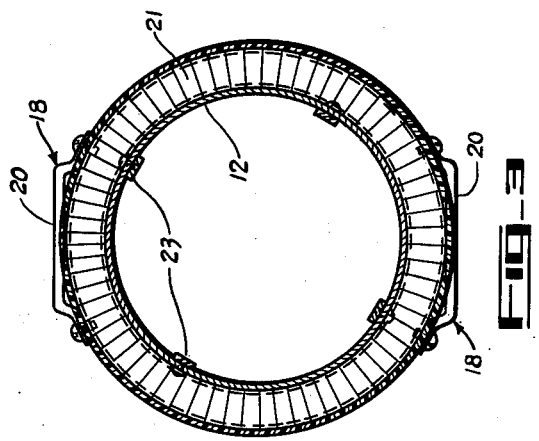
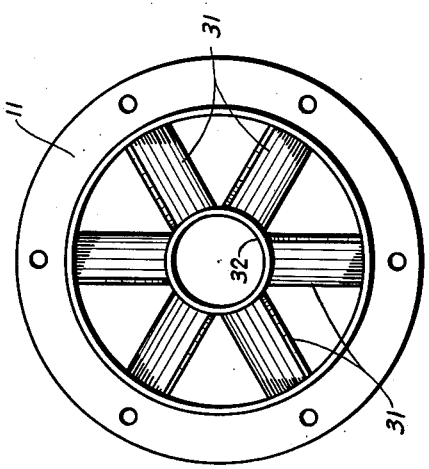
INVENTOR.
ROBERT H. RIDNOUR.
BY
ATTORNEY.

United States Patent Office 3,030,865
Patented Apr. 24, 1962

3,030,865
REACTIONLESS ROCKET LAUNCHER
Robert H. Ridnour, San Diego, Calif., assignor to General Dynamics Corporation, San Diego, Calif., a corporation of Delaware
Filed Mar. 18, 1959, Ser. No. 800,222
2 Claims. (Cl. 89—1.7)

The present invention relates to rocket launching apparatus, and more particularly relates to a launching apparatus from which rockets or missiles may be launched with an initial spin.

Some prior launching devices which have been used to provide an initial spin for rockets or missiles have utilized powerful and bulk motors of one kind or another to physically grip the rocket or launching tube and rotate it up to the desired spin speed. These devices are unduly burdensome and bulky, limiting their use to relatively stationary launching sites or requiring heavy transport vehicles.

Other prior rocket launching devices have used conventional tube or barrel "riflings" to achieve the desired initial rocket spin. This technique however, becomes less feasible as the size of the rocket to be fired increases. When barrel riflings are used to impart rotation to a rocket then the barrel itself is subjected to a corresponding but opposite rotation. As a consequence the barrel must either be allowed to rotate or be constrained. Whether the launch tube supporting structure is designed to permit or restrain launch tube rotation it is generally heavy, bulky, and often securely anchored in a firing pad or base. Such launching devices can hardly be considered as readily mobile devices.

In contrast, the present invention is a launching apparatus particularly adapted for mobility. Its novel design and lightweight construction make it portable by a single individual. The rocket launching tube employs rifling to impart rotation to the rocket, but an exhaust turbine is fixed to the rear of the launch tube to counteract the tendency of the launch tube itself to rotate.

An object of the present invention is to provide a relatively lightweight rocket launching apparatus capable of imparting an initial spin to rockets launched therefrom.

Another object is to provide such a rocket launching apparatus having a simple and lightweight means for substantially constraining rotational movement thereof during rocket launching operations.

Another object is to provide a rocket launching apparatus particularly adapted for mobility.

Other objects and features of the present invention will be readily apparent to those skilled in the art from the following specification and appended drawings wherein is illustrated a preferred form of the invention, and in which:

FIGURE 1 is a plan view of the rocket launching apparatus with the major portion thereof shown in cross section;

FIGURE 2 is an end view of the launching apparatus taken along line II—II of FIGURE 1; and FIGURE 3 is a cross-sectional view of the launching apparatus taken alone line III—III of FIGURE 1.

Referring now to the figures, the launching apparatus shown therein is generally comprised of a rocket launch tube 10 and a turbine section 11. The launch tube 10 has an inner cylinder 12 extending the length thereof and having an open rocket exit end 13 and an open rocket exhaust end 14. A plurality of rings 15 are concentrically positioned on the exterior of inner cylinder 12 and are uniformly spaced along its length. It is to be noted that a cross section of one of these rings 15 is such that there are two 90° angles in the member. This produces a substantially rigid ring member so that the structural strength and rigidity of inner cylinder 12 is considerably enhanced by a plurality of these rings being secured to its exterior as shown in FIGURE 1.

A number of fastening plates 18 are secured to various ring members 15 in order to provide a means by which the launching apparatus may be held, supported, or carried. Each fastening plate has at least one nut member 19 secured thereto and ready to receive a bolt if desired or needed. The plates 18 are shaped in such manner that a flat surface portion 20 is provided on each. This flat surface portion facilitates the connection of the launching apparatus to swivel joints and bearing type connections. Such connections may be desirable or even necessary in order to "train in" on a target during launching operations.

In order for inner cylinder 12 to have the structural rigidity and strength required for rocket launchings of the type contemplated, that is, initial spin stabilized rocket launchings, then more support than ring members 15 is required. At the same time however, any great increase in weight would undesirably impair the mobility of the launching apparatus. The difficulty is overcome by using lightweight but structurally strong honeycomb material. This honeycomb material, as indicated by numeral 21, is inserted between the rings 15 and is bonded thereto and to the exterior of inner cylinder 12. The exterior of inner cylinder 12, save for the fastener plate areas, is thus covered with sturdy honeycomb material.

A smooth outer surface is provided by a fiberglass skin 22 bonded to and covering all of the cylindrical surface save for the fastener plate areas. The launch tube structure thus provided is lightweight but strong, and through the use of a fiberglass skin becomes considerably immune to exterior corrosion often caused by rust, salt water spray and the like.

As previously mentioned, the present launching apparatus in intended to launch rockets with an initial spin. To impart the necessary spin to a rocket the inner cylinder 12 contains a number of rifling strips 23 which extend throughout its length. These rifling strips are arranged in uniformly spaced helix spirals and are rigidly fixed to the interior of cylinder 12. Although varied numbers of strips can be used, the preferred embodiment disclosed in the figures shows the use of only four such strips. A plurality of bearing pads 24 are also secured to the interior of cylinder 12. The pads are positioned between rifling strips 23 and are intended to facilitate movement of a rocket body within cylinder 12. These pads should thus be formed from a material having a low friction coefficient. One such material readily available on the commercial market is Teflon. The positions of the pads within cylinder 12 do not have to be as shown in the drawing but may be varied in accordance with the configuration of the rocket body or as desired. The thickness of the pads is such that a rocket body within the cylinder makes contact with both, rifling strips and bearing pads at the same time.

The spiral of the rifling strips can either be a right or left hand spiral, depending on the spin it is desired to impart to the rocket. The drawings show a rifling strip spiral that will give a right hand spin or clockwise spin to a rocket fired from the launching apparatus.

At the rear or exhaust end of cylinder 12 the rifling strips terminate, and a flange 27 is positioned about its exterior. The flange has a cylindrical portion 28 concentrically disposed on and firmly secured to the exhaust end of cylinder 12. An annular flare portion 29 is formed on the rear of cylindrical portion 28 and lies in a plane substantially coincident with the end of cylinder 12. This annular flare portion is given added structural strength by a number of ribs 30 disposed about the exterior of said cylindrical portion 28 and attached thereto and to the annular flare portion.

The cylindrical turbine section 11 shown adjacent the exhaust exit of cylinder 12 is rigidly fixed thereto by being secured to annular flare portion 29 of flange 27. The turbine section contains a plurality of fan blades or stator blades 31 arranged in a ring concentrically therein. The blades 31 extend substantially radially inward but leave a central open area in which a hollow ring member 32 is placed. Ring member 32 is secured to the blades and thereby strengthens the entire stator blade configuration. The blades themselves are canted or disposed at an angle with respect to the cylindrical turbine's axis. The particular "cant" or angle given these stator blades is dependent on the spiral of the rifling strips 23 disposed in cylinder 12. This can be more clearly seen from a description of the operation of the present invention.

Rockets are commonly ignited through the use of a small electrically responsive squib and upon ignition the squib apparatus is spewed out along with exhaust gases. When a rocket is disposed in the instant launching apparatus is can be ignited by a squib and a cable connected thereto through ring 32 of turbine 11. Upon ignition, the squib and cable will be spewed out through ring 32 and no damage will be done to the stator blades 31. As the rocket body moves down the cylinder 12 towards the exit end 13, the rifling strips cause it to rotate and achieve a spin which will improve its accuracy.

While the rifling strips are forcing the rocket body to rotate however, the launch tube itself is being subjected to forces by the rocket body which tend to give the launch tube a rotation opposite to that of the rocket body. The less mass the launch tube has then the greater will be its counter rotation. Since the present launch tube has a relatively small mass then it will have a considerable counter-rotation unless such counter-rotation is offset or negated in some manner. The turbine 11 attached to the exhaust end of the launch tube, coupled with the rocket exhaust gases, provides the means for cancelling the undesirable counter-rotation.

It should be noted that the rifling strips shown in the drawing will impart a right hand rotation to a rocket body. The launch tube thus experiences a left hand rotation, the rotation to be offset by the turbine. Referring to FIGURE 2 it is seen that the turbine's stator blades 31 are canted or angled so that rocket exhaust gases striking them will give the turbine a right hand rotation, a rotation which opposes and vitiates that of the launch tube. The net result is that this lightweight and compact launching apparatus experiences only negligible rotational movement during rocket launching operations. It is understood, of course, that should the rifling strips be spiralled to give a left hand spin to a rocket instead of a right hand spin, then the turbine's stator blades should be canted or angled in the opposite direction also. Then too, the angle of the blades may be varied in order to more precisely balance the opposing rotational effects of launch tube and turbine.

In the design of the turbine blades, their area, angle, and shape, it is also possible to achieve a balance between the drag forces created on the turbine device and the tendency of the rocket to drag the launch tube forward. This forward drag is a result of friction and the spiral angle of the rifling which tends to oppose forward motion of the rocket.

Even without precise balancing however, the instant launching apparatus can be used to launch rockets or missiles without its having to be anchored permanently to a launching pad, foundation or the like. And, while certain preferred embodiments of the invention have been specifically disclosed, it is understood that the invention is not limited thereto as many variations may be readily apparent to those skilled in the art and the invention is to be given its broadest possible interpretation within the terms of the following claims:

What I claim is:

1. Rocket launching apparatus comprising a launch tube, said launch tube having an inner cylinder with a rocket exit end and a rocket exhaust end, a plurality of substantially rigid rings concentrically arranged about the exterior of said inner cylinder, said rings spaced along the length of said inner cylinder and fixed thereto, honeycomb material disposed between said rings and secured to said rings and said inner cylinder to give structural strength thereto, an outer skin secured to and covering said rings and honeycomb material to provide a solid outer cylindrical surface for said launch tube, rifling means within said inner cylinder arranged to rotate a rocket body moving longitudinally therein towards said exit end, rotation of a rocket body within said launch tube prompting counter-rotation of said launch tube, a plurality of fan blades fixed to said launch tube and disposed substantially adjacent said inner cylinder rocket exhaust end, and said fan blades being canted to convert rocket exhaust which may issue from a rocket within said inner cylinder into rotation producing torques on said launch tube which oppose said counter-rotation.

2. Rocket launching apparatus comprising a launch tube, said launch tube having an inner cylinder with a rocket exit end and a rocket exhaust end, a plurality of rings concentrically arranged about the exterior of said inner cylinder, said rings spaced along the length of said inner cylinder and fixed thereto, means for fastening said launch tube to a support structure being attached to a plurality of said rings, honeycomb material disposed between said rings and secured to said rings and said inner cylinder to give structural strength thereto, an outer fiberglass skin secured to and covering said rings and honeycomb material, rifling means within said inner cylinder arranged to rotate a rocket body moving longitudinally therein towards said exit end, rotation of a rocket body within said launch tube prompting counter-rotation of said launch tube, a plurality of fan blades fixed to said launch tube and disposed substantially adjacent said inner cylinder rocket exhaust end, and said fan blades being canted to convert rocket exhaust which may issue from a rocket within said inner cylinder into rotation producing torques on said launch tube which oppose said counter-rotation.

References Cited in the file of this patent

UNITED STATES PATENTS

| | | |
|---|---|---|
| 2,405,414 | Eksergian | Aug. 6, 1946 |
| 2,421,522 | Pope | June 3, 1947 |
| 2,438,297 | Pope | Mar. 23, 1948 |
| 2,478,774 | Meinel | Aug. 9, 1949 |
| 2,598,256 | Hickman | May 27, 1952 |
| 2,845,741 | Day | Aug. 5, 1958 |
| 2,847,786 | Hartley et al. | Aug. 19, 1958 |
| 2,887,456 | Halford et al. | May 19, 1959 |

FOREIGN PATENTS

| | | |
|---|---|---|
| 9,197 | Great Britain | 1887 |